(12) United States Patent
Saka et al.

(10) Patent No.: US 10,910,675 B2
(45) Date of Patent: Feb. 2, 2021

(54) NONAQUEOUS ELECTROLYTE SECONDARY BATTERY

(71) Applicant: TOYOTA JIDOSHA KABUSHIKI KAISHA, Toyota (JP)

(72) Inventors: Hideyuki Saka, Toyota (JP); Keiichi Takahashi, Nishinomiya (JP); Hideaki Fujita, Kyotanabe (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 387 days.

(21) Appl. No.: 15/124,849

(22) PCT Filed: Mar. 5, 2015

(86) PCT No.: PCT/IB2015/000279
§ 371 (c)(1),
(2) Date: Sep. 9, 2016

(87) PCT Pub. No.: WO2015/136345
PCT Pub. Date: Sep. 17, 2015

(65) Prior Publication Data
US 2017/0025715 A1    Jan. 26, 2017

(30) Foreign Application Priority Data

Mar. 13, 2014  (JP) .................................. 2014-050524

(51) Int. Cl.
*H01M 4/505* (2010.01)
*H01M 4/525* (2010.01)
(Continued)

(52) U.S. Cl.
CPC ........ *H01M 10/4235* (2013.01); *C01G 53/50* (2013.01); *H01M 2/345* (2013.01);
(Continued)

(58) Field of Classification Search
None
See application file for complete search history.

(56) References Cited

U.S. PATENT DOCUMENTS 6,204,635 B1 *  3/2001  Sullivan .............. H01M 2/0426
                                                                    320/134
2009/0087752 A1    4/2009  Takahashi
(Continued)

FOREIGN PATENT DOCUMENTS

CN    102347510 A    2/2012
JP    2009-087647 A    4/2009
(Continued)

*Primary Examiner* — Yoshitoshi Takeuchi
(74) *Attorney, Agent, or Firm* — Sughrue Mion, PLLC (57) ABSTRACT

A nonaqueous electrolyte secondary battery according to the present invention includes: an electrode body including a positive electrode including a positive-electrode active material layer; an external terminal connected to the electrode body; a nonaqueous electrolyte including a gas generant, and a current interrupt device. A content of the gas generant is at least 4 mass %. The positive-electrode active material layer includes, as a positive-electrode active material, a complex oxide containing at least zirconium (Zr) and calcium (Ca) as constituent elements. When a sum total of metal elements, except metal that becomes a charge carrier, in the complex oxide is 100 mol % in terms of a mole percentage, the complex oxide contains Zr from 0.1 mol % to 0.5 mol % inclusive and Ca from 0.1 mol % to 0.3 mol % inclusive.

3 Claims, 1 Drawing Sheet (51) Int. Cl.
  *H01M 4/131* (2010.01)
  *H01M 4/1391* (2010.01)
  *H01M 10/0567* (2010.01)
  *H01M 10/42* (2006.01)
  *H01M 2/34* (2006.01)
  *H01M 10/0525* (2010.01)
  *C01G 53/00* (2006.01)

(52) U.S. Cl.
  CPC ........... *H01M 4/505* (2013.01); *H01M 4/525* (2013.01); *H01M 10/0525* (2013.01); *H01M 10/0567* (2013.01); *C01P 2002/50* (2013.01); *C01P 2002/52* (2013.01); *H01M 2200/20* (2013.01)

(56) References Cited

U.S. PATENT DOCUMENTS

| | | | |
|---|---|---|---|
| 2012/0028130 A1 | 2/2012 | Miyazaki et al. | |
| 2012/0183846 A1* | 7/2012 | Abe | H01M 4/505 429/188 |
| 2014/0093761 A1* | 4/2014 | Sakanaka | H01M 4/364 429/82 |

FOREIGN PATENT DOCUMENTS

| | | | | |
|---|---|---|---|---|
| JP | 2012-033397 A | 2/2012 | | |
| JP | 2012-252964 A | 12/2012 | | |
| JP | 2013-98027 | * 5/2013 | ......... | H01M 10/052 |
| JP | 2013-239375 A | 11/2013 | | |

* cited by examiner

NONAQUEOUS ELECTROLYTE SECONDARY BATTERY

BACKGROUND OF THE INVENTION

1. Field of the Invention

The present invention relates to a nonaqueous electrolyte secondary battery, and particularly relates to a nonaqueous electrolyte secondary battery including a positive-electrode active material and a gas generant.

2. Description of Related Art

A lithium-ion secondary battery and the like nonaqueous electrolyte secondary battery become more important as a vehicle-mounted power supply or a power supply for a PC or a portable terminal. Particularly, the lithium-ion secondary battery that is lightweight and has a high energy density is preferably used as a vehicle-mounted high-output power supply (e.g., Japanese Patent Application Publication No. 2009-087647 (JP 2009-087647 A), Japanese Patent Application Publication No. 2012-252964 (JP 2012-252964 A)). When such a nonaqueous electrolyte secondary battery enters an overcharge state, a charge carrier is released excessively from a positive electrode, and the charge carrier is inserted into a negative electrode excessively. Because of this, the positive electrode and the negative electrode are both unstable thermally. When the positive electrode and the negative electrode are both unstable thermally, an organic solvent in an electrolyte is decomposed eventually, thereby resulting in that an exothermic reaction occurs and stability of the battery is impaired.

In order to solve such a problem, such a nonaqueous electrolyte secondary battery is disclosed that a current interrupt device configured to interrupt charging when a gas pressure in a battery reaches a predetermined pressure or more is provided in a battery outer case, and a gas generant is added to an electrolyte. The gas generant is configured to generate gas when a predetermined overcharge state is reached. Examples of such a gas generant used herein include cyclohexylbenzene (CHB) and biphenyl (BP), for example (e.g., JP 2009-087647 A). When CHB or BP is used, a polymerization reaction is activated at the time of overcharge, so as to generate hydrogen gas. This increases a pressure in the battery outer case, so that the current interrupt device operates to interrupt an overcharge current.

SUMMARY OF THE INVENTION

In the meantime, for some use of the nonaqueous electrolyte secondary battery, it is assumed that the nonaqueous electrolyte secondary battery is used in a state where charging and discharging is repeated at a high rate. A nonaqueous electrolyte secondary battery that is used as a power source of a vehicle is a representative example of the nonaqueous electrolyte secondary battery to be used in such a state. It is known that a charging and discharging pattern in which high-rate charging and discharging is performed is easy to cause performance decrease in such a nonaqueous electrolyte secondary battery. According to the examination of the inventor(s) of the present, invention, in a case where high-rate charging and discharging is repeated, when the gas generant and the current interrupt device as described above are further employed, occurrence of gas due to the gas generant slows down. As a result, such a phenomenon occasionally occurs that an operation of the current interrupt device delays. It is desirable that the current interrupt device stably operate under a predetermined condition.

The present invention, provides a nonaqueous electrolyte secondary battery that is able to secure a gas generation amount of a gas generant appropriately even in a case where high-rate charging and discharging is repeated.

A nonaqueous electrolyte secondary battery (hereinafter just referred to as "secondary battery") according to one aspect of the present invention includes: an electrode body including a positive electrode configured such that a positive-electrode active material layer is held in a positive current collector, a negative electrode configured such that a negative-electrode active material layer is held in a negative current collector, and a separator provided between the positive electrode and the negative electrode; a case configured to accommodate therein the electrode body; an external terminal provided in the case, the external terminal is connected to the electrode body; a nonaqueous electrolyte accommodated in the case, the nonaqueous electrolyte including a gas generant configured to generate gas by causing a, reaction at a predetermined voltage or more; and a current interrupt device configured to interrupt electrical connection between the electrode body and the external terminal when an internal pressure of the case reaches a predetermined pressure or more, wherein: a content of the gas generant is at least 4 mass %, when a total mass of the nonaqueous electrolyte is 100 mass %; the positive-electrode active material layer includes, as a positive-electrode active material, a complex oxide containing at least zirconium and calcium as constituent elements; and the complex oxide contains zirconium from 0.1 mol % to 0.5 mol % inclusive and calcium from 0.1 mol % to 0.3 mol % inclusive, when a sum total of metal elements, except metal (e.g., lithium in a case of a lithium-ion secondary battery) that is a charge carrier, in the complex oxide is 100 mol % in terms of a mole percentage. In such a configuration, the positive-electrode active material contains Zr and Ca at the above ratio. Accordingly, even in a case where high-rate charging and discharging is repeated, it is possible to restrain a decrease in a gas generation amount by the gas generant appropriately. This can allow the current interrupt device to operate appropriately at the time of overcharge. In this case, a content of the gas generant may be at least 4 mass % (e.g., 4 mass % to 10 mass %), when a total mass of the nonaqueous electrolyte is 100 mass %. Such a content of the gas generant can exhibit the application effect descried above more effectively.

In one aspect of the secondary battery disclosed herein, the complex oxide contains Zr from 0.1 mol % to 0.2 mol % inclusive, when the sum total of the metal elements, except the charge carrier, in the complex oxide is 100 mol % in terms of a mole percentage. Since Zr is contained from 0.1 mol % to 0.2 mol % inclusive, excellent battery performance can be achieved.

The complex oxide may be a complex oxide having a layered crystal structure represented by General Formula: $Li_xNi_aCo_bMn_cZr_dCa_eMe_fO_2$ ... (1). Here, Me in Formula (1) may not be present or may be one or more elements selected from transition metal elements, typical metallic elements, and boron (B). Further, x, a, b, c, d, e and f are numbers that satisfy all of the following relationships: $0.99 \leq x \leq 1.2$, $0.9 \leq a+b+c+d+e+f \leq 1.1$, $0 < a \leq 0.5$, $0 < b \leq 0.5$, $0 < c \leq 0.5$, $0.001 \leq d \leq 0.005$, $0.001 \leq e \leq 0.003$, and $0 \leq f \leq 0.01$. In a preferable aspect, $a+b+c+d+e+f=1$ is satisfied. The complex oxide having a composition represented by General Formula (1) as such can have a high initial capacity and an excellent output characteristic.

In one aspect of the secondary battery disclosed herein, the nonaqueous electrolyte may contain, as the gas generant, cyclohexylbenzene (CHB) and biphenyl (BP). By using CHB and BP together, it is possible to yield the application effect described above more successfully.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

The following describes an embodiment of the present invention. Note that a matter that is not particularly mentioned in the present specification but is necessary for execution of the present invention can be understood as a design matter of a person skilled in the art based on conventional techniques in the art. The present invention can be performed based on what is described in the present specification and a common general technical knowledge in the art. Note that a "secondary battery" in the present specification indicates a general electrical storage device that is chargeable and dischargeable repeatedly, and is a term that covers a storage battery such as a lithium-ion secondary battery and a storage element such as an electric double layer capacitor. Further, a "nonaqueous electrolyte secondary battery" indicates a battery including a nonaqueous electrolyte (typically, an electrolyte in which a supporting salt (supporting electrolyte) is contained in a nonaqueous solvent). Further, a, "lithium-ion secondary battery" indicates a secondary battery that uses lithium ion as electrolyte ion and performs charging and discharging by migration of lithium ions between positive and negative electrodes. Further, an electrode active material indicates a material that can reversibly store and release chemical species (lithium ions in the lithium-ion secondary battery) serving as carriers.

The following describes a nonaqueous electrolyte secondary battery according to one embodiment of the present invention with reference to the drawing. The same reference sign is assigned to members/parts that yield the same effect. Further, the drawing is schematic, and does not necessarily show a real thing. Only one example is shown in the drawing, but does not limit the present invention without any special mention. The following deals with a case where the present invention is applied to a lithium-ion secondary battery, but it is not intended to limit an application subject of the present invention.

Figure 1:
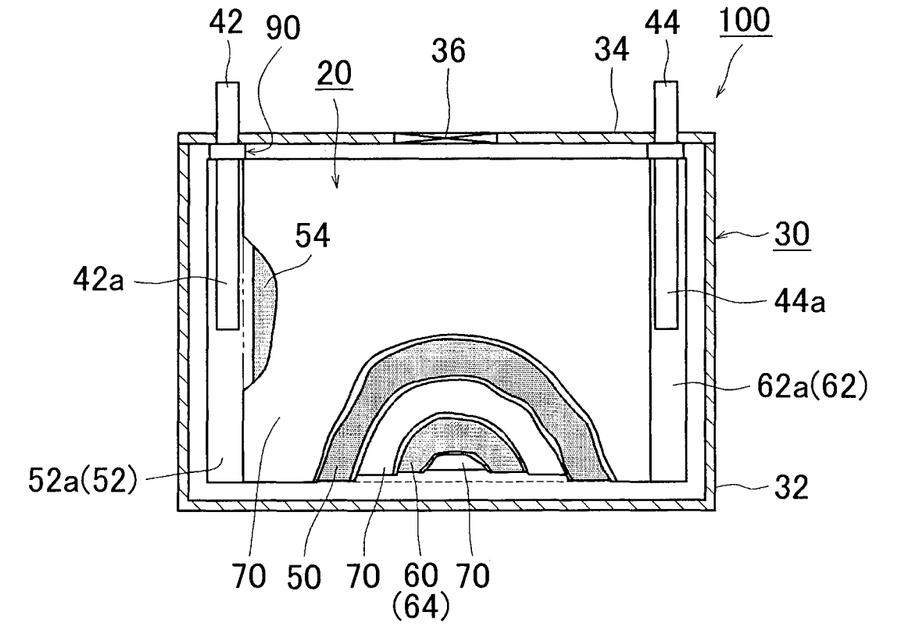
FIG. 1, is a view illustrating an example of a configuration of a nonaqueous electrolyte secondary battery.

As illustrated in FIG. 1, a lithium-ion secondary battery 100 disclosed herein includes: a positive electrode 50 configured such that a positive-electrode active material layer 54 is held in a positive current collector 52; a negative electrode 60 configured such that a negative-electrode active material layer 64 is held in a negative current collector 62; and an electrode body 20 including a separator 70 provided between the positive electrode 50 and the negative electrode 60. Further, the lithium-ion secondary battery 100 includes: a battery outer case 30 configured to accommodate the electrode body 20 therein; an external terminal 42 provided in the battery outer case 30; a nonaqueous electrolyte accommodated in the battery outer case 30; and a current interrupt device 90. The external terminal 42 is electrically connected to the electrode body 20. The nonaqueous electrolyte contains a gas generant (e.g., CHB or the like) configured to generate gas by causing a reaction at a predetermined voltage or more. The current interrupt device 90 is configured to interrupt an electrical connection between the electrode body 20 and the external terminal 42 when an internal pressure of the battery outer case 30 rises to a predetermined pressure or more at the time of overcharge.

A positive-electrode active material used for the lithium-ion secondary battery 100 disclosed herein is made of a complex oxide including at least zirconium (Zr) and calcium (Ca) as its constituent elements. When a sum total of metal elements, except metal (here lithium) that, becomes a charge carrier, in the complex oxide is 100 mol % in terms of a mole percentage, the complex oxide contains Zr by 0.1 mol % to 0.5 mol % and Ca by 0.1 mol % to 0.3 mol %.

The positive-electrode active material that contains Zr and Ca by 0.1 mol % or more can restrain consumption of the gas generant at the time of high-rate charging and discharging, in comparison with a conventional positive-electrode active material which does not contain Zr and Ca or which contains Zr and Ca by less than 0.1 mol %. This makes it possible to cause a sufficient reaction of the gas generant at the time of overcharge and to stably generate a desired amount of gas. The pressure in the battery outer case 30 is increased due to the generation of gas, thereby making it possible to operate the current interrupt device 90 appropriately.

The positive-electrode active material disclosed herein preferably contains Zr by 0.1 mol % or more and Ca by 0.1 mol % or more, more preferably contains Zr by 0.12 mol % or more and Ca by 0.2 mol % or more, and particularly preferably contains Zr by 0.15 mol % or more and Ca by 0.3 mol % or more. On the other hand, if the positive-electrode active material contains Ca by more than 0.3 mol %, electron conductivity tends to decrease and a battery resistance tends to increase, which is unfavorable. From the viewpoint of restraining the increase in the resistance, it is preferable that the positive-electrode active material contain Ca by 0.3 mol % or less. For example, the positive-electrode active material that contains Ca by not less than 0.1 mol % but not more than 0.3 mol % (particularly, not less than 0.1 mol % but not more than 0.2 mol %) and contains Zr by 0.1 mol % or more is suitable from the viewpoint of balancing securing a gas generation amount at the time of overcharge and restraint of the increase in the resistance. Further, if the positive-electrode active material contains Zr by more than 0.5 mol %, an initial capacity tends to decrease, which is unfavorable. From the viewpoint of achieving a high capacity, it is preferable that the positive-electrode active material contain Zr by 0.5 mol % or less. For example, the positive-electrode active material that contains Zr by not less than 0.1 mol % but not more than 0.5 mol % (particularly, not less than 0.1 mol % but not more than 0.2 mol %) and contains Ca by 0.1 mol % or more is suitable from the viewpoint of balancing securing the gas generation amount at the time of overcharge and achieving of a high capacity.

It is possible to use, as the positive-electrode active material, one or more substances conventionally used for a lithium-ion secondary battery without any particular limit as long as the above conditions are satisfied. For example, a layered lithium transition metal complex oxide (which could have a rock-salt structure or a spinel structure), namely, a complex oxide that contains, as constituent metal elements, lithium and two or more metal elements including zirconium and calcium can be used. When the layered lithium transition metal complex oxide is used as the positive-electrode active material, a battery having a high capacity and a high energy density can be obtained. In view of this, the layered lithium transition metal complex oxide can be used preferably.

An example of the layered lithium transition metal complex oxide is a lithium transition metal complex oxide represented by General Formula (1): $Li_xNi_aCo_bMn_cZr_dCa_eMe_fO_2$ (herein, Me is not present or is one or more elements selected from transition metal elements, typical metal elements, and boron (B); and x, a, b, c, d, e and f are numbers that satisfy all of the following relationships: $0.99 \leq x \leq 1.2$, $0.9 \leq a+b+c+d+e+f \leq 1.1$, $0 < a \leq 0.5$, $0 < b \leq 0.5$, $0 < c \leq 0.5$, $0.001 \leq d \leq 0.005$, $0.001 \leq e \leq 0.003$, and $0 \leq f \leq 0.01$). In a preferable aspect, $a+b+c+d+e+f=1$). Note that, in a chemical formula representing the lithium transition metal oxide in the present specification, a composition ratio of O (oxygen) is 2, for convenience. However, the composition ratio of O should not be 2 strictly, but some variation in the composition (typically in a range of not less than 1.95 but not more than 2.05) is permitted.

As shown in Formula (1), the lithium transition metal complex oxide used herein contains, as essential constituent elements, lithium (Li), zirconium (Zr), calcium (Ca), nickel (Ni), cobalt (Co), and manganese (Mn). Such a lithium transition metal complex oxide may contain at least one metal element Me other than Li, Zr, Ca, Ni, Co, and Mn (that is, f>0), or may not contain the metal element Me (that is, f=0). The metal element Me can be typically one or more metal elements selected from transition metal elements, typical metal elements, and the like other than Li, Zr, Ca, Ni, Co, and Mn. Specific examples thereof include tungsten (W), magnesium (Mg), strontium (Sr), titanium (Ti), vanadium (V), niobium (Nb), chromium (Cr), molybdenum (Mo), ferrum (Fe), rhodium (Rh), palladium (Pb), platinum (Pt), copper (Cu), zinc (Zn), boron (B), aluminum (Al), gallium (Ga), indium (In), tin (Sn), lanthanum (La), cerium (Ce), and the like. Note that a content of the element Me (that is, a value of f in Formula (1)) is not limited in particular, but can be $0 \leq f \leq 0.01$ (e.g., $0 \leq f \leq 0.005$), for example.

Further, a, b, and c in Formula (1) are not limited in particular as far as, $0.9 \leq a+b+c+d+e+f \leq 1.1$, $0 < a \leq 0.5$, $0 < b \leq 0.5$, and $0 < c \leq 0.5$ are satisfied, and it does not matter which one of a, b, c is largest. In other words, a first element (an element with a largest content in terms of the number of atoms) among Ni, Co, and Mn may be any of Ni, Co, and Mn. For example, a can be not less than 0.1 (typically, 0.3 or more) but less than 0.5 (typically, 0.45 or less, e.g., 0.4 or less). Further, b can be not less than 0.1 (typically, 0.3 or more) but not more than 0.5 (typically, 0.45 or less, e.g., 0.4 or less). Furthermore, c can be not less than 0.1 (typically, 0.3 or more) but not more than 0.5 (typically, 0.45 or less, e.g., 0.4 or less). In a preferable embodiment, a, b, and c (that is, contents of Ni, Co, and Mn) are approximately the same.

Further, d and e in Formula (1) are not limited in particular as far as $0.9 \leq a+b+c+d+e+f \leq 1.1$, $0.001 \leq d \leq 0.005$, and $0.001 \leq e \leq 0.003$ are satisfied. For example, d can be not less than 0.001 (e.g., 0.0015 or more) but not more than 0.005 (e.g., 0.004 or less, e.g., 0.002 or less). Further, e can be not less than 0.001 (e.g., 0.0015 or more) but not more than 0.003 (e.g., 0.0025 or less, e.g., 0.002 or less). In a preferable embodiment, $a+b+c+d+e+f=1$, $0.001 \leq d \leq 0.005$, and $0.001 \leq e \leq 0.003$ are satisfied. Further, x in Formula (1) is a value determined so as to satisfy a charge neutrality condition, and satisfies $0.99 \leq x \leq 1.2$ (e.g., x=1), for example.

Such a lithium transition metal complex oxide typically has a particulate shape (secondary particles) formed such that primary particles aggregate. A property of such particles is not limited in particular, but an average particle diameter (D50 diameter) is not less than 0.5 μm is (typically, 1 μm or more, e.g., 2 μm or more, preferably 3 μm or more) but is not more than 20 μm (typically, 15 μm or less, e.g., 10 μm or less). The positive-electrode active material layer 54 formed by use of such particles is minute and highly conductive. Further, air gaps can be held moderately in the positive-electrode active material layer 54, so that the electrolyte is easy to penetrate into the positive-electrode active material layer 54, and a wide reaction field with the gas generant can be secured at the time of overcharge. Accordingly, it is possible to balance high battery performance and reliability at the time of overcharge at a higher level.

A manufacturing method of the lithium transition metal complex oxide in such a particulate shape is not limited in particular. However, the lithium transition metal complex oxide in such a particulate shape can be manufactured, for example, in such a manner that: a hydroxide (a precursor) of metal elements (Ni, Co, Mn, Me) is obtained by a wet method (a precursor forming step); the precursor thus obtained is mixed with a suitable lithium (Li) source, a zirconium (Zr) source, and a calcium (Ca) source (a mixing step); and the resultant mixture is burned at a predetermined temperature (a burning step). Note that the manufacturing method of the positive-electrode active material may be described below by taking, as an example, a positive-electrode active material of which its average composition is represented by General Formula (1): $Li_xNi_aCo_bMn_cZr_dCa_eMe_fO_2$. However, it is not intended to limit the present invention to such a specific embodiment.

In the precursor forming step, typically, an aqueous solution containing, as starting materials, a nickel (Ni) source, a cobalt (Co) source, a manganese (Mn) source, and a Me element source is prepared, and a hydroxide of the metal elements is precipitated (crystallized) under an alkaline condition (a condition of pH>7). Here, respective contents of the metal sources (the Ni source, the Mn source, the Me source) in the aqueous solution should be determined appropriately so as to obtain a mole ratio of a, b, c, f in General Formula (1).

The aqueous solution can be prepared by dissolving, in an aqueous solvent, transition metal element sources (a Ni source, a Co source, a Mn source, a Me source; typically, a water soluble ionic compound) at respective predetermined amounts. An anion of the metal element source can be a sulfate ion, a nitrate ion, a carbonate ion, a hydroxide ion, a chloride ion, or the like. The aqueous solvent to be used to prepare the aqueous solution is typically water, but a mixed solvent containing water as a main body is also usable. As a solvent, other than water, constituting the mixed solvent, one or more organic solvents (e.g., lower alcohol, lower ketone, and the like) that can be mixed with water uniformly can be appropriately selected to use. As a compound that can alkalize the aqueous solution, a compound which contains a strong base (a hydroxide of alkali metal, or the like) and/or a weak base (ammonia or the like) and which does not obstruct formation (deposition) of the hydroxide can be preferably used. For example, one or more compounds selected from sodium hydroxide (NaOH), potassium hydroxide (KOH), ammonia gas ($NH_3$), and the like can be used. Especially, the use of sodium hydroxide is preferable.

In the mixing step, the precursor obtained as above is mixed with a lithium source, a zirconium source, and a calcium source. A mixing method is not limited in particular, and a well-known dry mixing method or wet mixing method can be employed. As the lithium source, a general lithium compound used in formation of a lithium oxide can be used without any limitation in particular. Examples of the lithium source include lithium salts such as lithium carbonate ($LiCO_3$), lithium hydroxide (LiOH), lithium nitrate ($LiNO_3$), lithium sulfate ($Li_2SO_4$), and lithium chloride (LiCl). Further, examples of the zirconium source include zirconia ($ZrO_2$), zirconium hydroxide, zirconium nitrate, zirconium sulfate, zirconium chloride, and the like. Furthermore, examples of the calcium source include calcium hydroxide ($Ca(OH)_2$), calcium oxide, calcium nitrate, calcium sulfate, calcium chloride, and the like. As each of the Li source, the Zr source, and the Ca source, one selected from its exemplary compounds can be used solely, or two or more compounds selected therefrom can be used in combination. A mixing ratio of the precursor, the Li source, the Zr source, and the Ca source may be determined appropriately based on respective numbers of moles of the Li source, the Zr source, and the Ca source relative to a total number of moles of all the metal elements contained in the precursor. Those respective numbers of moles of the Li source, the Zr source, and the Ca source are selected so that x, d, e in Formula (1) have desired values.

In the burning step, the mixture of the precursor with the Li source, the Zr source, and the Ca source is burned. Hereby, the positive-electrode active materials disclosed herein can be manufactured. A burning temperature is not limited in particular, but can be, for example, not less than 650° C. (typically, 700° C. or more, e.g., 750° C.) but not more than 1050° C. (typically, 1000° C. or less). Such a burning condition can be preferably employed in the manufacture of a positive-electrode active material used for a lithium-ion secondary battery for purposes that put much value on an increase in output performance, for example, like a hybrid vehicle.

The resultant burned product is pulverized typically, and then sieved to obtain particles having a desired particle diameter as needed, so that the particles can be used as the positive-electrode active material. In the manufacturing method, after the hydroxide (the precursor) of the metal elements (Ni, Co, Mn, Me) is formed, the mixture of the precursor with the Li source, the Zr source, and the Ca source is burned. When the Zr source and the Ca source are added at the time of burning the precursor and Li source as such, it is possible to obtain positive-electrode active material particles in which Zr and Ca are uniformly distributed. Since Zr and Ca are uniformly distributed in the positive-electrode active material particles, the application effect descried above can be exhibited more effectively.

Next will be described a configuration of a lithium-ion secondary battery that uses the positive-electrode active material. The following deals with a lithium-ion secondary battery formed such that a wound-type electrode body (hereinafter referred to as "wound electrode body") and a nonaqueous electrolyte are accommodated in a square-shaped case (here, a rectangular-solid box shape). Note that the battery structure is not limited to the example illustrated herein, that is, the battery structure is not limited to a square-shaped battery in particular.

FIG. 1 illustrates the lithium-ion secondary battery 100 according to one embodiment of the present invention. As illustrated in FIG. 1, the lithium-ion secondary battery 100 includes a wound electrode body 20 and a battery outer case 30. As illustrated in FIG. 1, the lithium-ion secondary battery 100 according to one embodiment of the present invention is configured such that the flat wound electrode body 20 and a liquid electrolyte (electrolyte; not shown) are accommodated in the flat rectangular battery outer case (that is, an outer container) 30.

The battery outer case 30 is constituted by a case main body 32 having a box shape (that is, a bottomed rectangular-solid shape) having an opening in one end (corresponding to an upper end of the battery in a usual usage state of the battery), and a cover 34 made of a rectangular plate member and attached to the opening so as to close the opening. An exemplary material of the battery outer case 30 is aluminum, for example. As illustrated in FIG. 1, a positive terminal 42 and a negative terminal 44 both used for external connections are formed in the cover 34. A relief valve 36 is formed between the terminals 42, 44 of the cover 34.

The wound electrode body 20 includes a positive electrode (a positive electrode sheet 50) having a, continuous-sheet shape, a negative electrode (a negative electrode sheet 60) having a continuous-sheet shape similarly to the positive electrode sheet 50, and two separators (separators 70) having a continuous-sheet shape.

The positive electrode sheet 50 includes a belt-shaped positive current collector 52, and a positive-electrode active material layer 54. A belt-shaped aluminum foil having a thickness of about 15 μm is used as the positive current collector 52. A positive-electrode active material layer non-forming part 52a is set along an edge of the positive current collector 52 on one side in a width direction. In the example illustrated herein, the positive-electrode active material layer 54 is formed on either side of the positive current collector 52 except for the positive-electrode active material layer non-forming part 52a set in the positive current collector 52. The positive-electrode active material layer 54 includes a positive-electrode active material, a binder, and a conductive material.

As described above, the complex oxide including at least zirconium (Zr) and calcium (Ca) as its constituent elements is used as the positive-electrode active material. Further, polyvinylidene fluoride (PVdF) is used as the binder. Further, in addition to the positive-electrode active material and the binder, the conductive material can be mixed. As the conductive material, carbon black such as acetylene black (AB) or Ketjen black, or other powdered carbon materials (graphite and the like) can be mixed. These materials are dispersed in a suitable dispersing medium and kneaded, so as to prepare a positive-electrode active material layer forming composition (paste). The positive-electrode active material layer 54 is formed such that the positive-electrode active material layer forming composition is applied to the positive current collector 52, and then dried and pressed in a predetermined thickness.

The negative electrode sheet 60 includes a belt-shaped negative current collector 62 and a negative-electrode active material layer 64. A belt-shaped copper foil having a thickness of about 10 μm is used as the negative current collector 62, for example. A negative-electrode active material layer non-forming part 62a is set along an edge of the negative current collector 62 on one side in a width direction. The negative-electrode, active material layer 64 is formed on either side of the negative current collector 62 except for the negative-electrode active material layer non-forming part 62a, set in the negative current collector 62. The negative-electrode active material layer 64 includes a negative-electrode active material, a thickening agent, a binder, and so on.

As the negative-electrode active material, it is possible to use one or more substances conventionally used for a lithium-ion secondary battery without any particular limit. A preferable example thereof is a carbon-based material such as graphite carbon. Similarly to the positive electrode, a negative-electrode active material forming composition (paste) can be prepared by dispersing and kneading the negative-electrode active material and the binder such as PVDF, SBR, CMC (which can serve as the thickening agent) with a suitable dispersing medium. The negative-electrode active material layer 64 is formed such that the negative-electrode active material layer forming composition is applied to the negative current collector 62, and then dried and pressed in a predetermined thickness.

The separators 70 are members that separates the positive electrode sheet 50 from the negative electrode sheet 60. In this example, the separators 70 are each constituted by a base material having a plurality of minute pores and having a band-like shape with a predetermined width. The base material used herein is, for example, a sheet material having a single-layered structure constituted by porous polyolefin resin (e.g., a single-layered structure of polyethylene), or a sheet material having a layered structure (e.g., a three-layer structure of polypropylene, polyethylene, and polypropylene).

The wound electrode body 20 is attached to the electrode terminals 42, 44 attached to the battery outer case 30 (the cover 34, in this example). The wound electrode body 20 is accommodated in the battery outer case 30 in a state where the wound electrode body 20 is bent flatly by pushing in one direction perpendicular to a winding shaft. Further, the wound electrode body 20 is configured such that the positive-electrode active material layer non-forming part 52a of the positive electrode sheet 50 and the negative-electrode active material layer non-forming part 62a of the negative electrode sheet 60 protrude, toward different sides in a winding shaft direction. One external terminal (the positive terminal) 42 is fixed to the positive-electrode active material layer non-forming part 52a of the positive current collector 52 via a positive-electrode current collector tab 42a, and the other external terminal (the negative terminal) 44 is fixed to the negative-electrode active material layer non-forming part 62a of the negative current collector 62 via a negative-electrode current collector tab 44a. The wound electrode body 20 is accommodated in a flat internal space of the case main body 32. After the wound electrode body 20 is accommodated in the case main body 32, the case main body 32 is closed by the cover 34.

As the electrolyte (nonaqueous electrolyte), it is possible to use a nonaqueous electrolyte conventionally used for a lithium-ion secondary battery without any particular limit. The nonaqueous electrolyte typically has a composition in which a supporting salt is contained in an appropriate nonaqueous solvent. As the nonaqueous solvent, ethylene carbonate, dimethyl carbonate, diethyl carbonate, ethylmethyl carbonate, and the like can be used, for example. Further, as the supporting salt, lithium salts such as $LiPF_6$ can be used, for example.

The nonaqueous electrolyte contains a gas generant configured to generate gas by causing a reaction at a predetermined voltage or more. In the technique described herein, it is preferable to use two or more gas generants, and it is preferable that one of them be cyclohexylbenzene (CHB) or biphenyl (BP). In a preferable embodiment, CHB and BP are used together. The cyclohexylbenzene (CHB) and the biphenyl (BP) make contact with a surface (typically, a surface of the positive-electrode active material) of the positive electrode at the time of overcharge from about 4.35 V to 4.6 V, for example, so as to be decomposed by oxidation and polymerized. Hereby, hydrogen ions are generated. The hydrogen ions spread in the negative electrode, and receive electrons on the negative electrode, so as to generate hydrogen as reducing gas. Typically, the following polymerization reaction is activated to generate the hydrogen gas.

Cyclohexylbenzene (CHB) $n[C_{12}H_{16}] \rightarrow (C_{12}H_{14})_n + nH_2$ Biphenyl (BP) $n[C_{12}H_{10}] \rightarrow (C_{12}H_8)_n + nH_2$ An additive amount of the gas generant to the nonaqueous electrolyte is at least 4 mass % (e.g., not less than 4 mass % but not more than 10 mass %, preferably not less than 4 mass % but not more than 6 mass %), when a total mass of the nonaqueous electrolyte is assumed 100 mass %. When the additive amount of the gas generant is within such a range, a sufficient amount of gas can be generated at the time of overcharge, in cooperation with Zr and Ca being contained in the positive-electrode active material at a predetermined ratio. If the content of the gas generant is too small, a predetermined amount of gas may not be generated under predetermined conditions. In the meantime, if the content of the gas generant is too large, battery performance (e.g., an output characteristic) for the gas generant to work as a battery resistance component may be decreased.

Further, the lithium-ion secondary battery 100 includes the current interrupt device 90. The current interrupt device 90 is a mechanism configured to interrupt electrical connection (current paths) between the electrode body 20 and the external terminal when an internal pressure of the battery outer case rises to a predetermined pressure or more. In the present embodiment, the current interrupt device 90 is provided inside the positive terminal 42, as illustrated in FIG. 1, so that a conductive path for battery current in the positive electrode (electrical connection between the positive electrode of the electrode body 20 and the positive terminal 42) is interrupted.

The following describes some examples related to the present invention, but it is not intended to limit the present invention to the following examples.

Example 1

A positive electrode of a cell for evaluation was formed as follows. First, a positive-electrode active material powder, PVdF as a binder, and AB as a conductive material were mixed in NMP so that a mass ratio of these materials satisfied 91:3:6. Thus, a composition for a positive-electrode active material layer was prepared: The composition for a positive-electrode active material layer was applied, in a belt shape, to either side of an aluminum foil (a positive current collector) having a continuous-sheet shape, and then dried. Thus, a positive electrode sheet having a positive-electrode active material layer on either side of the positive current collector was manufactured. A positive-electrode active material used herein was obtained by adding, at a predetermined ratio, Zr and Ca to a complex oxide represented by a basic composition $LiNi_{1/3}Co_{1/3}Mn_{1/3}O_2$. An additive amount of each of Zr and Ca was 0.1 mol % (in terms of a mole percentage when a sum total of metal elements (Ni, Co, Mn, Zr, and Ca), except Li, in the complex oxide is assumed 100 mol %).

Graphite (powder) as a negative-electrode active material, SBR, and CMC were mixed with water so that a mass ratio of these materials was 98:1:1. Thus, a composition for a negative-electrode active material layer was prepared. The composition for a negative-electrode active material layer was applied to either side of an elongated copper foil (a negative current collector), and then dried. Thus, a negative electrode sheet having a negative-electrode active material layer on either side of the negative current collector was manufactured.

The positive electrode sheet and the negative electrode sheet thus formed were laminated via two separators and then wound. Thus, an electrode body was formed. The electrode body and a nonaqueous electrolyte were accommodated in a battery outer case (a cylindrical container of 18650 type was used). The nonaqueous electrolyte used herein was obtained as follows. A mixed solvent containing ethylene, carbonate (EC), dimethyl carbonate (DMC), and ethylmethyl carbonate (EMC) such that a volume ratio thereof was 3:3:4 was prepared. Then, $LiPF_6$ was dissolved in the mixed solvent so that a concentration thereof was about 1 mol/L. Further, cyclohexylbenzene (CHB) and biphenyl (BP) as gas generants were added to the nonaqueous electrolyte. A total amount of the gas generants relative to the nonaqueous electrolyte was 4 mass %. The cell for evaluation (a lithium-ion secondary battery) was assembled in this way. Note that the cell for evaluation is provided with, a current interrupt device (CID) configured to interrupt electrical connection between the electrode body and the electrode terminal when an internal pressure in the battery outer case reaches a predetermined pressure or more.

Example 2

A content of Ca in the positive-electrode active material was set to 0.3 mol %. A lithium-ion secondary battery was formed in the same procedure as in Example 1 other than this point.

Example 3

A content of Zr in the positive-electrode active material was set to 0.2 mol %. A lithium-ion secondary battery was formed in the same procedure as in Example 1 other than this point.

Example 4

A content of Zr in the positive-electrode active material was set to 0.2 mol % and a content of Ca in the positive-electrode active material was set to 0.3 mol %. A lithium-ion secondary battery was formed in the same procedure as in Example 1 other than this point.

Example 5

A content of Zr in the positive-electrode active material was set to 0.5 mol %. A lithium-ion secondary battery was formed in the same procedure as in Example 1 other than this point.

Example 6

A content of Zr in the positive-electrode active material was set to 0.5 mol % and a content of Ca in the positive-electrode active material was set to 0.3 mol %. A lithium-ion secondary battery was formed in the same procedure as in Example 1 other than this point.

Comparative Example 1

A content of Zr in the positive-electrode active material was set to 0.5 mol % and a content of Ca in the positive-electrode active material was set to 0 mol % (that is, Ca was not added). A lithium-ion secondary battery was formed in the same procedure as in Example 1 other than this point.

Comparative Example 2

A content of Zr in the positive-electrode active material was set to 0.5 mol % and a content of Ca in the positive-electrode active material was set to 0.4 mol %. A lithium-ion secondary battery was formed in the same procedure as in Example 1 other than this point.

Comparative Example 3

A content of Zr in the positive-electrode active material was set to 0.5 mol % and a content of Ca in the positive-electrode active material was set to 0.3 mol %. Further, a total amount of the gas generant relative to the nonaqueous electrolyte was 0.6 mass %. A lithium-ion secondary battery was formed in the same procedure as in Example 1 other than this point.

<<Evaluation on Lithium-Ion Secondary Battery for Evaluation Test>>

Each of the lithium-ion secondary batteries of the above examples was subjected to evaluation about an initial capacity, an IV resistance, a capacity retention rate after enduring cycles, and whether or not the current interrupt device operated in an overcharge test.

<Initial Capacity (Rated Capacity)>

Each cell for evaluation was charged to 4.1 V at a constant current of 1 C, and then charged at a constant voltage (CCCV charging) so that a total charging time was three hours.

After that, the charging was stopped for ten minutes. Subsequently, the each cell was charged to 4.1 V at a constant current of 0.33 C (CV charging), and then, the charging was stopped for ten minutes. The each cell was then, discharged to 3.0 V at 0.33 C, and further discharged at a constant voltage until a total discharge time was four hours. Subsequently, the discharging was stopped for ten minutes (CCCV discharge). A service capacity in the CCCV discharge was assumed an initial capacity. A result thereof is shown in a corresponding column in Table 1.

<IV Resistance>

Each cell for evaluation was adjusted such that its charging state was about 60% (SOC 60%) of the initial capacity. Then, the each cell was discharged at a current value of 10 C for 10 seconds under an environmental atmosphere of 25° C., and a voltage value ten seconds after the discharging started was measured. Thus, an IV resistance was calculated. A result thereof is shown in a corresponding column in Table 1.

<Capacity Retention Rate after Enduring High-Rate Cycles>

A charging and discharging cycle in which the charging was performed to 4.1 V at 2 C under an environment of 60° C., and then the discharging was performed to 3.1 V at 2 C was repeatedly performed on each cell for evaluation 500 times successively. A battery capacity after the each cell endured high-rate cycles was measured under the same condition as the initial capacity, and a capacity retention rate after enduring high-rate cycles was calculated from (battery capacity after enduring high-rate cycles/initial capacity)× 100. A result thereof is shown in a corresponding column in Table 1.

<Overcharge Test>

By use of each cell for evaluation before and after the high-rate cycle durability test, an overcharge test in which the each cell was charged to an SOC of 140% in a test tank at 25° C. so as to obtain an overcharge state was performed. It was checked whether or not the current interrupt device (CID) operated before the each cell reached the SOC of 140%. A result thereof is shown in a corresponding column in Table 1. A cell in which a current interrupt device operated before the cell reached the SOC of 140% is evaluated as "○", and a cell in which the current interrupt device did not operate is evaluated as "x".

TABLE 1

|  | Content of Zr/Content of Ca (mol %) | CHB + BP (mass %) | Cid Operation Before Cycle Test | Cid Operation After Cycle Test | Initial Capacity (mAh/g) | Resistance (mΩ) | Capacity Retention Rate (%) |
|---|---|---|---|---|---|---|---|
| Example 1 | 0.1/0.1 | 4 | ○ | ○ | 175 | 51 | 92 |
| Example 2 | 0.1/0.3 | 4 | ○ | ○ | 176 | 52 | 91 |
| Example 3 | 0.2/0.1 | 4 | ○ | ○ | 175 | 50 | 92 |
| Example 4 | 0.2/0.3 | 4 | ○ | ○ | 175 | 51 | 92 |
| Example 5 | 0.5/0.1 | 4 | ○ | ○ | 174 | 52 | 91 |
| Example 6 | 0.5/0.3 | 4 | ○ | ○ | 173 | 54 | 89 |
| Comparative Example 1 | 0.5/0 | 4 | ○ | x | 172 | 58 | 82 |
| Comparative Example 2 | 0.5/0.4 | 4 | ○ | ○ | 174 | 72 | 73 |
| Comparative Example 3 | 0.5/0.3 | 0.6 | ○ | x | 172 | 58 | 82 |

As illustrated in Table 1, the cell for evaluation according to Comparative Example 1 is configured such that Ca is not contained in the positive-electrode active material. The cell for evaluation had a low capacity retention rate after the cycles, and thus, its durability was low. Further, in terms of the overcharge gas generation amount, after the high-rate cycle test, a gas generation amount slowed down and the operation of the current interrupt device delayed. In the meantime, the cell for evaluation according to Comparative Example 2 is configured such that the content of Zr in the positive-electrode active material is 0.5 mol % and the content of Ca in the positive-electrode active material is 0.4 mol %. Although the cell for evaluation herein ensured a sufficient gas amount after the high-rate cycle test and the current interrupt device operated appropriately, the IV resistance was higher and the output characteristic was insufficient. On the other hand, the cells for evaluation according to Examples 1 to 6 are configured such that respective contents of Zr in the positive-electrode active material are 0.1 mol % to 0.5 mol % and respective contents of Ca in the positive-electrode active material are 0.1 mol % to 0.3 mol %. Each of these cells for evaluation had a capacity retention rate of more than 85% after the high-rate cycle test, and had excellent durability as compared with Comparative Examples 1 to 3. Further, the cells for evaluation according to Examples 1 to 5 had overcharge gas generation amounts larger than Comparative Example 1, and their overcharge gas generation amounts were at a level that allowed their current interrupt devices to operate appropriately. From these results, it is confirmed that, when the content of Zr in the positive-electrode active material is in a range of 0.1 mol % to 0.5 mol % and the content of Ca in the positive-electrode active material is in a range of 0.1 mol % to 0.3 mol %, a high-performance lithium-ion secondary battery that satisfies all of the output characteristic, the cycle durability, and the gas generation amount at the time of overcharge can be provided.

Here, in a case of the batteries subjected to the test, when the content of Zr in the positive-electrode active material is set in a range of 0.1 mol % to 0.2 mol %, a high initial capacity of 175 mAh/g or more could be realized. From the viewpoint of achieving a high capacity, it is preferable that the content of Zr in the positive-electrode active material be in a range of 0.1 mol % to 0.2 mol %. Further, in the battery of Comparative Example 3 in which the content of the gas generant is 0.6 mass %, the gas generation amount after the high-rate cycle test slowed down, and the operation of the current interrupt device delayed. From this result, a suitable content of the gas generant is about 1 mass % or more (for example, not less than 1 mass % but not more than 10 mass %). The content of the gas generant is preferably about 2 mass % or more, and particularly preferably 4 mass % or more.

The lithium-ion secondary battery according to one embodiment of the present invention has been described above. However, the secondary battery according to the present invention is not limited to any embodiment described above, and various modifications can be made.

For example, the above description deals with the lithium-ion secondary battery as a typical example of the nonaqueous electrolyte secondary battery, but the present invention is not limited to a secondary battery of this type. For example, the nonaqueous electrolyte secondary battery of the present invention may be a secondary battery in which a metal ion (e.g., a sodium ion) other than the lithium ion is a charge carrier, or may be a nickel metal hydride battery or a nickel cadmium battery.

The secondary batteries disclosed herein each can allow the current interrupt device to operate stably even after high-rate charging and discharging, as described above. Accordingly, the secondary batteries are each preferable as a battery (typically, a battery for a driving power supply) to be provided in a vehicle such as an automobile. Accordingly, according to the present invention, it is possible to provide a vehicle including any of the secondary batteries disclosed herein (which can be in a form of a battery pack in which a plurality of batteries is connected to each other). Particularly, a vehicle (e.g., a plug-in hybrid vehicle (PHV) that can be charged by a domestic power supply and an electric vehicle (EV)) including the secondary battery as a power source can be provided.

The invention claimed is:

1. A nonaqueous electrolyte secondary battery comprising:
    an electrode body including
        a positive electrode configured such that a positive-electrode active material layer is held in a positive current collector, a negative electrode configured such that a negative-electrode active material layer is held in a negative current collector, and a separator provided between the positive electrode and the negative electrode;

a case configured to accommodate the electrode body;

an external terminal provided in the case, the external terminal being connected to the electrode body;

a nonaqueous electrolyte accommodated in the case, the nonaqueous electrolyte including a gas generant configured to generate gas by causing a reaction at a predetermined voltage or more; and a current interrupt device provided inside the external terminal and configured to interrupt electrical connection between the electrode body and the external terminal when an internal pressure of the case reaches a predetermined pressure or more, a content of the gas generant being at least 4 mass % when a total mass of the nonaqueous electrolyte is 100 mass %, the gas generant is cyclohexylbenzene and biphenyl, the positive-electrode active material layer including, as a positive-electrode active material, a complex oxide having a layered crystal structure represented by General Formula:

$$Li_xNi_aCo_bMn_cZr_dCa_eMe_fO_2 \qquad (1),$$

wherein x, a, b, c, d, e and f are numbers that satisfy all of the following relationships:

$0.99 \leq x \leq 1.2$, $0.9 \leq a+b+c+d+e+f \leq 1.1$, $0<a\leq0.5$, $0<b\leq0.5$, $0<c\leq0.5$, $0.001\leq d\leq0.005$, $0.001\leq e\leq0.003$, and $0\leq f\leq0.01$ Me is not present or is one or more elements selected from transition metal elements, typical metal elements and boron, wherein the nonaqueous electrolyte secondary battery exhibits a capacity retention rate of 85% or higher after 500 charging and discharging cycles.

2. The nonaqueous electrolyte secondary battery according to claim 1, wherein $0.001\leq d\leq0.002$.

3. The nonaqueous electrolyte secondary battery according to claim 1, wherein the content of the gas generant is 10 mass % or less when the total mass of the nonaqueous electrolyte is 100 mass %.

* * * * *